US009762935B2

(12) United States Patent
Davies (10) Patent No.: US 9,762,935 B2
(45) Date of Patent: Sep. 12, 2017

(54) MULTI-SYSTEM REQUEST MANAGER FOR COD ASSET INSERTION

(71) Applicant: Canoe Ventures, LLC, Englewood, CO (US)

(72) Inventor: Daniel Davies, Elizabeth, CO (US)

(73) Assignee: Canoe Ventures, LLC, Englewood, CO (US)

( * ) Notice: Subject to any disclaimer, the term of this patent is extended or adjusted under 35 U.S.C. 154(b) by 6 days.

(21) Appl. No.: 14/943,643

(22) Filed: Nov. 17, 2015

(65) Prior Publication Data

US 2017/0142456 A1 May 18, 2017

(51) Int. Cl.
*H04N 21/234* (2011.01)
*H04N 21/61* (2011.01)
*H04N 21/239* (2011.01)
*H04N 21/262* (2011.01)
*H04N 21/81* (2011.01)

(52) U.S. Cl.
CPC ... *H04N 21/23424* (2013.01); *H04N 21/2393* (2013.01); *H04N 21/26258* (2013.01); *H04N 21/6125* (2013.01); *H04N 21/6143* (2013.01); *H04N 21/812* (2013.01)

(58) Field of Classification Search
None
See application file for complete search history.

(56) References Cited

U.S. PATENT DOCUMENTS

| 2008/0046924 A1* | 2/2008 | Hood | G06Q 30/02 725/36 |
| 2010/0158098 A1 | 6/2010 | McSchooler et al. | |
| 2011/0015989 A1* | 1/2011 | Tidwell | G06Q 30/02 705/14.43 |

* cited by examiner

*Primary Examiner* — Omar S Parra
(74) *Attorney, Agent, or Firm* — Duft Bornsen & Fettig LLP; Gregory T. Fettig (57) ABSTRACT

Embodiments herein provide for protocol independent asset insertion decisioning. One embodiment provides for communicatively coupling a plurality of COD providers to a request manager and communicatively coupling a plurality of ADSs to the request manager. Some of the COD providers have different communication protocols. The request manager processes requests from the COD content providers for asset insertions from the ADSs according to the communication protocols of the COD providers, receives asset insertion decisions from the ADSs, and conveys the asset insertion decisions of the ADSs to the COD providers. The request manager then processes a request from a first of the COD providers to switch from a first of the ADSs to a second of the ADSs, directs the second ADS to perform an asset insertion decision on behalf of the first COD provider, and conveys the asset insertion decision from the second ADS to the first COD provider.

18 Claims, 7 Drawing Sheets

| Request Manager 120 | | | |
|---|---|---|---|
| COD Provider 104-1 | COD Provider 104-2 | ... | COD Provider 104-N |
| Protocol Type: DOCSYS | Protocol Type: SMS | | Protocol Type: TCP/IP |
| ADSs Used: 100-1 100-3 | ADSs Used: 100-3 100-9 100-11 | | ADSs Used: 100-4 |
| ADS Addresses: 100-1 = 0x0001 100-3 = 0x001F | ADS Addresses: 100-3 = 0x001F 100-9 = 0x00FF 100-11 = 0x0F1F | | ADS Addresses: 100-4 = 0x0004 |
| ADS Satisfaction: 100-1 = 8 100-3 = 9 | ADS Satisfaction: 100-3 = 0 100-9 = 7 100-11 = 9 | | ADS Satisfaction: 100-4 = N/A |

MULTI-SYSTEM REQUEST MANAGER FOR COD ASSET INSERTION

CROSS REFERENCE TO RELATED APPLICATIONS

This patent application is related to commonly owned and co-pending patent application Ser. No. 13/628,324, 13/628,360, and 13/628,381 (each having a filing date of Sep. 27, 2012), the entire contents of each of which are incorporated by reference.

FIELD OF THE INVENTION

The invention relates to the field of Content On Demand (COD) systems and asset insertions into COD content selections.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services increased, television evolved into a much more complex system of communications. Today, cable television providers and satellite television providers serve as intermediary content providers between the content providers and the intended public audience. And, the number of content providers has increased accordingly. In this regard, many members of the general public have signed on as customers of the cable/satellite content providers so as to receive a broader availability of content.

Because the market for content consumption has grown, the number of content providers has also grown. And, because each of these providers has its own method of content delivery, the manner in which the content and assets are delivered to the customers has become increasingly complex. Generally, the content providers deliver the content to the content providers with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the content providers with directions to insert the assets within the timeslots purchased by the company.

The content providers may also have certain timeslots available for inserting certain local assets. For example, a content provider may have "headends" configured in various communities to distribute content to their customers located therein. Each headend receives content from the content providers with various designated timeslots for inserting assets into the content. Some of those timeslots may be designated for local advertisements where companies within the service area of the headend wish to advertise. These companies purchase those timeslots from the content provider for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the content providers' customers are able to digitally record entire episodes of content and view that content at their leisure, as opposed to a time established by the content providers. However, these customers can also use the digital recorders to fast-forward or skip through the assets without viewing them, much to the dismay of the asset owners.

In response, content providers started providing content on a "Content On Demand" (COD) basis, sometimes referred to as nonlinear video distribution. In COD, the content provider delivers the content to the content provider which in turn maintains the content for subsequent and individual distribution to their customers. Thus, a customer may select a desired content through a set-top box (STB), a smart phone, computer, or the like (collectively referred to herein as "customer premise equipment" or "CPE") and watch that content at the customer's leisure.

This COD content can also be configured with timeslots where assets may be inserted. For example, an advertiser desiring to place an advertisement in a particular TV show may pay the owner of that TV show (e.g., a content provider such as NBC, ABC, CBS, etc.) to insert their advertisements into one or more the timeslots in the COD content. Once inserted, the asset is delivered in the COD content to a user's CPE.

SUMMARY

Systems and methods presented herein provide a centralized access to a plurality of asset decision systems (ADSs) that direct asset insertions to COD content providers. In one embodiment, a method operable in a COD environment provides for communicatively coupling a plurality of COD providers to a request manager and communicatively coupling a plurality of ADSs to the request manager. At least two of the COD providers have different communication protocols. The method also provides for processing requests from the COD content providers through the request manager for asset insertions from the ADSs according to the communication protocols of the COD provider, receiving asset insertion decisions from the ADSs, and conveying the asset insertion decisions of the ADSs to the COD providers. The method also provides for processing a request from a first of the COD providers to switch from a first of the ADSs to a second of the ADSs and directing the second ADS to perform an asset insertion decision on behalf of the first COD provider. Then, the method provides for conveying the asset insertion decision from the second ADS to the first COD provider.

The various embodiments disclosed herein may be implemented in a variety of ways as a matter of design choice. For example, the embodiments may take the form of physical machines, computer hardware, software, firmware, or combinations thereof. In one embodiment, a computer readable medium is operable to store software instructions for directing the asset insertion into content. These software instructions are configured so as to direct a processor or some other processing system to operate in the manner described above.

Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
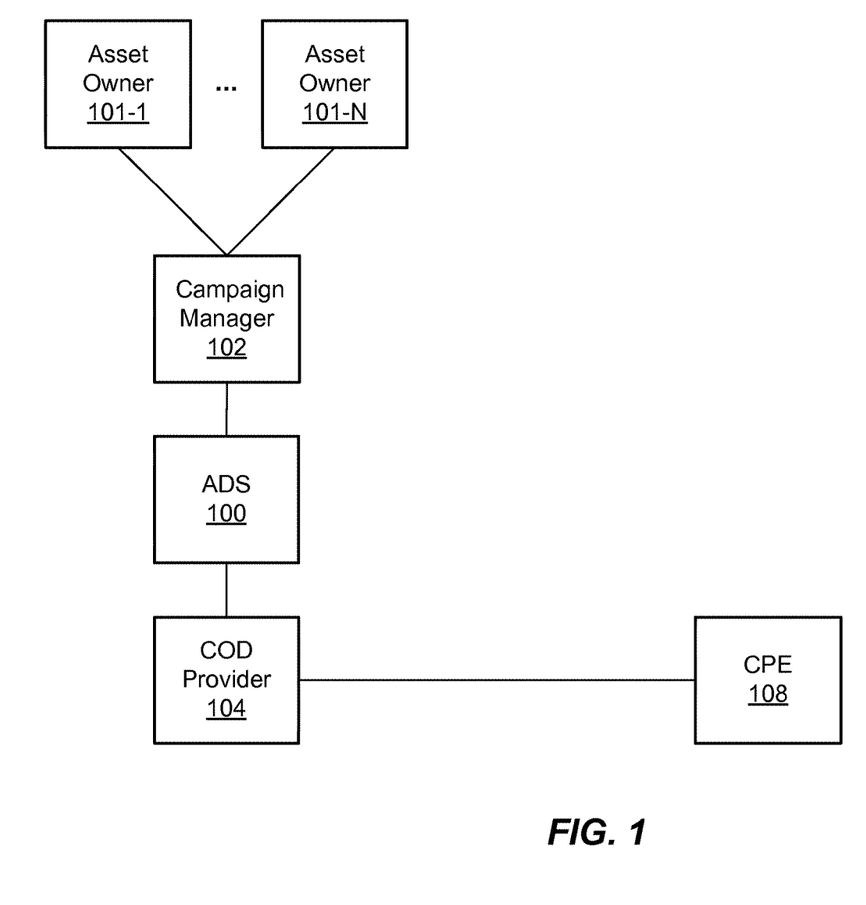
FIG. 1 is a block diagram of an exemplary ADS that directs assets for insertion into the COD content on behalf of a COD provider.

FIG. 1 is a block diagram of an exemplary ADS 100 that directs assets for insertion into the COD content on behalf of a COD provider 104. As mentioned, COD content selections made by a user through the user's CPE 108 can have assets (e.g., advertisements) inserted therein by a COD provider 104, such as a cable television headend, satellite television operator, or even a content owner. The ADS 100 is operable to improve the asset insertions by removing conflicting assets and/or ranking remaining assets such that they provide more value to the content provider 104 and/or asset owners 101-1-101-N (where the reference "N" is merely intended to represent an integer greater than "1" and not necessarily equal to any other "N" reference herein).

Generally, assets promoting products and services on television are maintained in databases by asset owners 101. A campaign manager 102 may include the databases that store local and national advertisements for COD content insertion in addition to the various campaign rules that are to be implemented with the COD content insertion. For example, the asset owners 101 develop campaigns which are subsequently managed and maintained by the campaign manager 102. The asset campaigns comprise rules and asset descriptions (e.g., configured as a data structure) that an asset owner 101 may believe serves the asset owner 101's best marketing interests. Then, these campaigns are passed to the ADS for the ADS to determine the best manner in which the assets of the asset owners 101 are to be inserted into the COD content provided by the COD provider 104.

The rules of the asset campaigns assist the ADS in determining how to exclude and/or promote certain assets in the COD content. For example, the Coca-Cola Company may have a number of advertisements it wishes to be inserted into COD content. Each of those advertisements may be associated with a campaign that targets various demographics of viewers (e.g., age, sex, ethnicity, location, etc.). Some of those assets may even cross multiple campaigns. And, each asset campaign has rules that may, for example, prevent Pepsi-Cola Company advertisements from being inserted too close in time to Coca-Cola advertisements. The campaign manager 102 manages these asset campaigns and provides them to the ADS 100 such that the ADS 100 can select assets that provide value to the COD provider 104 while complying with the rules of the asset campaigns.

The ADS 100 is any device, system, software, or combination thereof operable to implement the rules of the campaigns and subsequently rank assets for insertion in the content provided by COD provider 104. The ADS 100 is generally configured as a system that is separate and distinct from the COD provider 104 such that the ADS 100 may interact with a plurality of COD providers. In some embodiments the campaign manager 102 and the ADS 100 are implemented together so as to provide a compact/centralized system for maintaining asset campaigns and directing insertion of the assets into the COD content while still being able to serve multiple COD providers. Additional details regarding the ADS 100 and the actual insertion of assets in the COD content are shown and described below.

The CPE 108 is any device or system capable of providing content from a content provider 104 to a user. For example, a CPE 108 may be a set-top box operable to communicate with a cable television headend. Alternatively, a CPE 108 can be a computer or a mobile computing device capable of displaying video from a network (e.g., via streaming video over the Internet). For example, a CPE 108 may select a desired content from an Internet website hosted with an internet server through the network. Once selected, a COD system may retrieve the content from a content database for Internet delivery to the selecting CPE 108.

Figure 2:
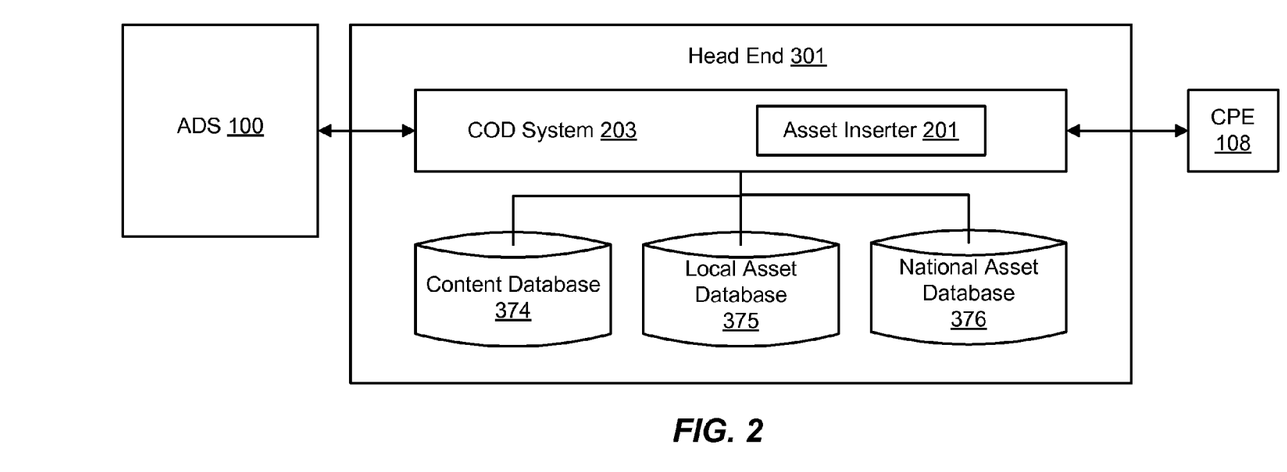
FIG. 2 is a block diagram of a headend operable with an exemplary ADS.

FIG. 2 is a block diagram of an exemplary ADS 100 operable with a COD system 203 (also known as a "COD back office system") of a headend 301. The ADS 100 illustrates one example of how the ADS 111 may operate. The headend 301, in this embodiment, is generally any system operable to receive content for processing and distribution to a CPE 108 (e.g., over a cable television infrastructure or from satellite). For example, the headend 301 may receive content from content providers over television signals for distribution to the customers of a cable content provider via the CPE 108, such as a set-top box (STB), a gaming console, a smart phone, an electronic tablet, a computer, or the like.

The COD system 203 of the headend 301 provides the COD content to the CPE 108 when desired by the customer. For example, the headend 301 may receive the content from the content providers and maintain that content within a content database 374. The headend 301 may also maintain local assets in a local asset database 375 and national assets in a national asset database 376. When a particular COD content is selected by the user of the CPE 108, an asset inserter 201 of the COD system 203 accesses the content database 374 to retrieve the selected content and deliver that content to the CPE 108.

The COD system 203 is any system or device that is operable to deliver video content to the CPE 108 when directed by the CPE 108. The databases 374, 375, and 376 are any systems or devices operable to store and maintain data, audio, and/or video for subsequent distribution to the CPE 108. For example, the databases 374, 375, and 376 may be operable within a computer system that stores the video and audio (e.g., MPEG) content and assets such that they may be accessed by the COD system 203 and delivered to the CPE 108 when desired by the user of such.

Figure 3:
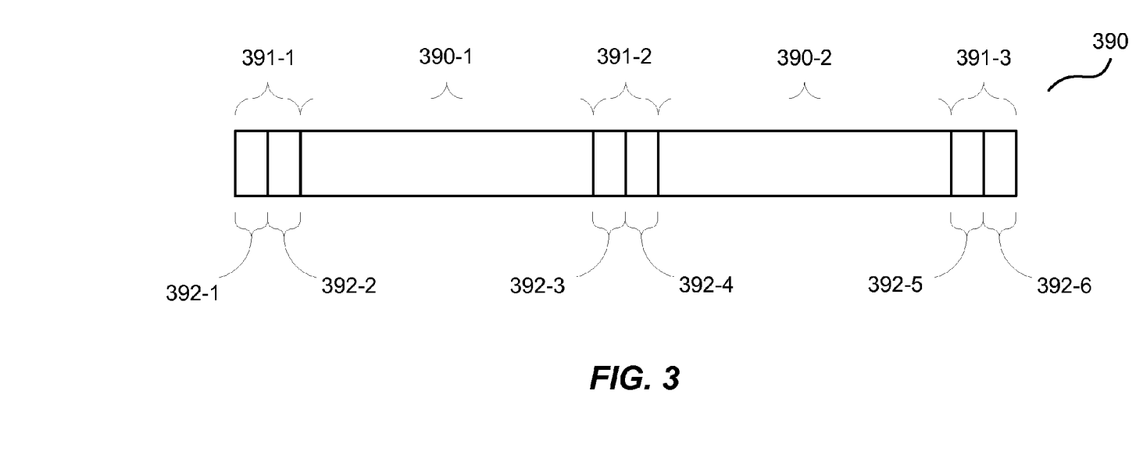
FIG. 3 is an exemplary timing diagram of a COD content selection with timeslots available for asset insertion.

To illustrate the insertion of assets into content, FIG. 3 shows an exemplary timing diagram of content 390 interlaced with asset timeslots 391, also known as "break positions". When the COD system 203 receives a message from the CPE 108 for the content 390, the COD system 203 retrieves the content 390 from the content database 374. The content 390, in this embodiment, is divided into two segments 390-1 and 390-2 with timeslots 391 disposed at the front end of the content 390-1 (i.e., timeslot 391-1 at the pre roll position), in between the content segments 390-1 and 390-2 (i.e., timeslot 391-2 at the mid roll position), and at the end of the content segment 390-2 (i.e., timeslot 391-3 at the post roll position). Each timeslot 391 is divided into two asset placement timeslots 392 (i.e., asset placement opportunities), each of which is capable of accepting an asset that is typically, but not always, 30 seconds in duration. Thus, a placement opportunity is generally a subset of time of a particular timeslot 391. The ADS 100 directs the COD system 203 to insert the assets according to a particular ranking that provides value for the content provider (e.g., monetary value, enhanced relationships with asset providers, etc.). In this regard, the ADS 100 may direct the COD system 203 to select assets from the national asset database 376 and/or the local asset database 375 for insertion into the asset timeslots 392-1-392-6 based on the ranking provided by the ADS 100.

Also, the invention is not intended be limited to any particular number of content segments 390 or any particular number of asset timeslots. In fact, an asset timeslot 392 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 392 may be configured to accept insertions of two 15 second assets. For example, the content 390 may be configured with the mid roll timeslot 391-2 having two 30 second asset timeslots 392-3 and 392-4. The asset timeslot 392-3 can thus be further divided into two 15 second asset timeslots 392-3-1 and 392-3-2, allowing for the insertion of two 15 second assets into the asset timeslot 392-3. Still, the invention is not intended to be limited to any particular asset duration, asset timeslot 392 duration, or timeslot 391 duration as such may be configured to meet certain business and/or technical needs.

It should be noted that the decisions regarding the direction of asset insertions occur quite rapidly. For example, the ADS 100 may be operable to make asset insertion decisions for a plurality of headends 301. And, each headend 301 may be operable to provide COD content to a plurality of CPEs 108 at any given time, possibly thousands or more. Thus, when a COD content selection is made by a particular CPE 108, the ADS 100 responds in substantially real time to ensure that the COD system 203 has ample time to retrieve and insert the assets while processing the content selected by the CPE 108.

Figure 4:
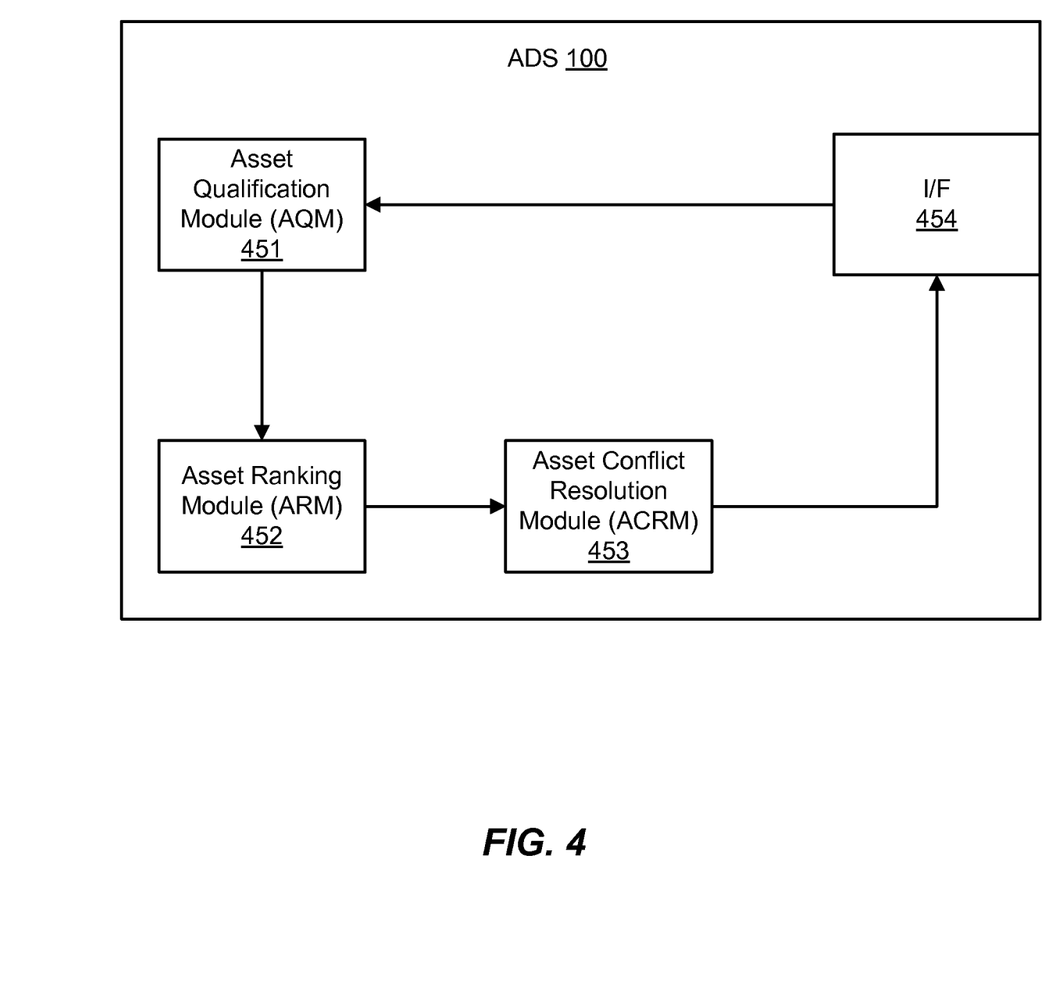
FIG. 4 is a block diagram of an exemplary ADS.

FIG. 4 is a block diagram of an exemplary ADS 100. In this embodiment, the ADS 100 includes an interface 454, an asset qualification module (AQM) 451, an asset ranking module (ARM) 452, and an asset conflict resolution module (ACRM) 453. The interface 454 is any device or system operable to receive information pertaining to a content selection by a CPE 108 such that the ADS 100 may direct asset insertion into the selected content. In this regard, the interface 454 may also be operable to transfer information to the COD system 203 to direct the COD system 203 to insert certain assets from the national asset database 376 and/or the local asset database 375.

The AQM 451 is any device or system operable to communicate with the interface 454 to initially qualify assets for insertion within the content. The AQM 451 may exclude certain assets from insertion into the content selected by the CPE 108. The ARM 452 is any device or system operable to rank the remaining assets (i.e., those not already excluded by the AQM 451) for insertion to the content 390. The ACRM 453 is any device or system operable to remove any ranked assets from insertion into the content 390 based on conflicts between assets. For example, the ACRM 453 may determine that assets from certain advertisers conflict with one another (e.g., Coke and Pepsi). Accordingly, the ACRM 453 may be operable to prevent assets from these advertisers from being inserted within a same timeslot 391 or even within a same content 390. The exemplary operations of the AQM 451, the ARM 452, and the ACRM 453 are explained in greater detail below.

The ADS 100, being communicatively coupled to the COD system 203, processes information pertaining to the content selection and selects assets for insertion into that content from a national asset database and/or a local asset database, as illustrated in FIG. 2. To provide more context to the operations of the ADS 100, the following example is provided.

To illustrate, a CPE 108 selects a particular episode of the television show "30 Rock" at 8 pm on a Thursday night from a menu of COD content that is presented by the COD system 203. The COD system 203 retrieves that episode of 30 Rock from the content database 374. The COD system 203 then retrieves certain assets from the national asset database 376 for insertion into the timeslots of that show. As with many other 30 minute situational comedies, this episode of 30 Rock includes two content sections 390-1 and 390-2 and the three timeslots 391-1, 391-2, and 391-3, as illustrated in FIG. 3. Using this example, the COD system 203 transfers an asset insertion request to the AQM 451 to insert assets into these three timeslots. The AQM 451 then determines that there are a total of six 30 second asset placement opportunities within three timeslots 391-1-3 of the selected content 390. The AQM 451 then processes the active campaigns to determine their eligibility within those six 30 second asset placement opportunities. Among the active campaigns in this example are:

1. A Coca-Cola campaign with a total of four assets and 3 campaign items directing placement opportunities of those assets as follows:
   a) Asset 1 for 100 views anytime;
   b) Asset 2 for any viewing opportunities Monday through Friday between the hours of 5 pm and 10 pm; and
   c) Assets 3 and 4 for any viewing opportunities Friday and Saturday between the hours of 5 pm and 10 pm.

2. A Pepsi-Cola campaign with a total of five assets and four campaign items directing placement opportunities of those assets as follows:
   a) Asset 1 for 20 views anytime;
   b) Asset 2 for 100 views anytime;
   c) Asset 3 for 1000 views anytime;
   d) Asset 4 for any viewing opportunities Monday through Friday between the hours of 5 pm and 10 pm; and
   e) Asset 5 for any viewing opportunities Friday and Saturday between the hours of 5 pm and 10 pm.
3. A Capital One credit card campaign with a total of four assets and three campaign items directing placement opportunities of those assets as follows:
   a) Asset 1 for 100 views anytime;
   b) Asset 2 for 1000 views anytime; and
   c) Assets 3 and 4 for any viewing opportunities Monday through Friday between the hours of 5 pm and 10 pm.
4. A Chrysler Motors campaign with a total of three assets and two campaign items directing placement opportunities of those assets as follows:
   a) Asset 1 for 100 views; and
   b) Assets 2 and 3 for any viewing opportunities Monday through Friday between the hours of 5 pm and 10 pm.
5. A Nickelodeon campaign with one asset and one campaign item directing placement opportunities of that asset as follows:
   a) Asset 1 for 100 views.

Since the television show 30 Rock has a mature theme and since the Nickelodeon campaign is directed towards a younger audience, that campaign item is automatically excluded from the eligible campaign list by the AQM 451. Other remaining campaign items are excluded based on time and date (i.e., campaign items 1c and 2e).

Thus the remaining campaigns of 1a-1b, 2a-2d, 3a-c, 4a-4b are transferred to the ARM 452 for ranking Based on various factors explained in greater detail below, the ARM 452 ranks the campaigns as follows:
   1. Campaign Item 2a
   2. Campaign Item 1a
   3. Campaign Item 3c
   4. Campaign Item 2b
   5. Campaign Item 4b
   6. Campaign Item 4a
   7. Campaign Item 1b
   8. Campaign Item 1d
   9. Campaign Item 2c
   10. Campaign Item 1c
   11. Campaign Item 2d
   12. Campaign Item 3a
   13. Campaign Item 3b The ARM 452 transfers this ranked list of campaign items to the ACRM 453 to determine conflicts within the ranked list of campaign items. Typically, the six available asset placement opportunities 392-1-6 within the content 390 would be filled by the first six campaign items based on a rank determined by the ARM 452. However, since some conflicts may exist between campaigns within a particular content and/or timeslot, certain campaigns may be excluded from the placement opportunities 392 such that the ranking is reordered. For example, certain criteria may dictate that a Pepsi Cola asset may not be placed within the same content as a Coca-Cola asset. In this regard, the campaign items 1a-1d are removed from the ranked list because the Pepsi-Cola asset has the higher initial ranking, leaving the following campaign items:
   1. Campaign Item 2a
   2. Campaign Item 3c
   3. Campaign Item 2b
   4. Campaign Item 4b
   5. Campaign Item 4a
   6. Campaign Item 2c
   7. Campaign Item 2d
   8. Campaign Item 3a
   9. Campaign Item 3b With this computed, the ACRM 453 may remove the final three campaign items 7, 8, and 9 from the list as the six placement opportunities can be filled with assets. The ACRM 453 then transfers this information regarding asset placement to the COD system 203.

Once all of the campaign items at each campaign have been evaluated and no campaigns remain or once all of the placement opportunities have been filled, the ACRM 453 directs the COD system 203 to retrieve the assets based on the list generated. For example, the list may be included in a report message that is transferred to the COD system 203 to direct the COD system 203 to insert the assets into the content selected by the CPE 108. It is possible that all of the assets have been excluded during the processes described herein. Thus, the ACRM 453 may then direct the COD system 203 to not place any assets in the content selected by the CPE 457.

The ACRM 453 may even direct the COD system 203 to place assets from the local database 375 and/or the national database 376 into the selected COD content as desired. The ACRM 453 may also direct the COD system 203 to place assets relating to content, programming, or even services provided by the content provider. For example, if no assets remain, standard programming information, such as time and date, pertaining to the selected COD content may be configured as an asset and placed in the selected COD content. To further illustrate, when an episode of "Modern Family" is selected by a CPE 108 and no assets remain for insertion into the available time slots of that episode, the ACRM 453 may direct the COD system 203 to present the user of the CPE 108 with the date and time when the next episode of Modern Family can be seen.

Since it is also possible that not all of the assets in the list may be placed as there may be more assets than available opportunities, the ACRM 453 may weight the assets prior to placement in the selected COD content. For example, certain assets may provide greater value to the content provider (e.g., the television network). In this regard, the ACRM 453 may rank the remaining assets in a manner that provides the most monetary compensation to the content provider. Thus, the ACRM 453 may reduce the list of available assets for insertion to the amount of opportunities, or timeslots, in the selected COD content to provide this value to the content provider. In any case, the ACRM 453 directs the COD system 203 to place the assets in the selected COD content based on the ranked list. Once placement has been directed, the ACRM 453 generates a placement report and transfers that report to the headend 301 so that the headend 301 can track marketing views (e.g., for later negotiations between content providers and marketers). For example, when a marketer can know how many views of a particular asset there were in a selected COD content, the marketer can assign a value to that asset that may be used in negotiating price for additional views of the asset in future selected COD content.

Figure 5:
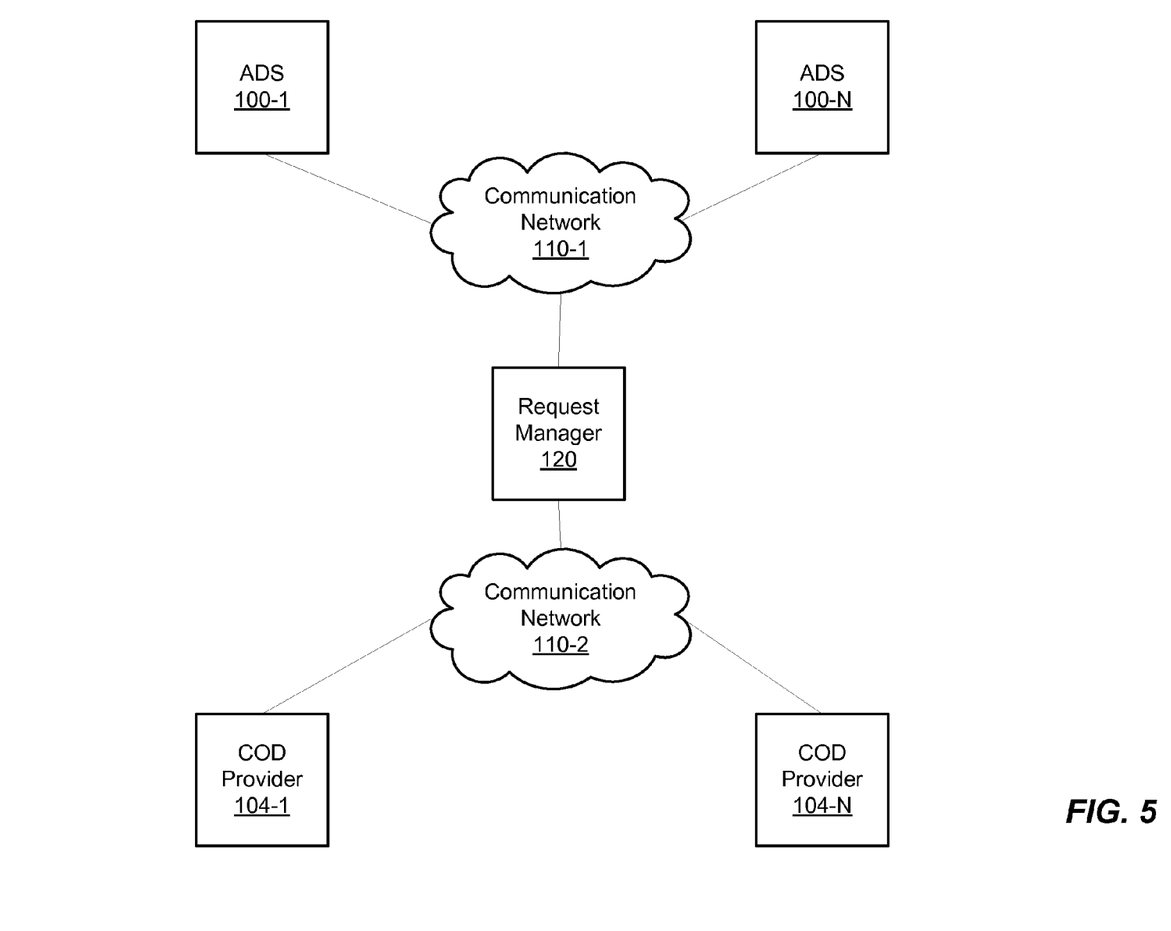
FIG. 5 is a block diagram of a request manager operable with a plurality of ADSs.

FIG. 5 is a block diagram of a request manager 104 operable with a plurality of ADSs 100-1-100-N. The request manager 120 is operable to interface with a plurality of COD providers 104-1-104-N to process requests from the COD providers 104 for asset insertion decisions by the ADSs 100-1-100-N. Each COD provider 104 may have a specific ADS 100 that the COD provider 104 uses for asset insertions. The relationships between the COD providers 104 and the ADSs 100 may be based on some preference for a particular ADS, a contractual obligation, etc.

Generally, the request manager 120 is distinct and separate from the COD providers 104 and the ADSs 100. This alleviates some of the burden associated with any particular communication protocol variations between COD providers 104 and ADSs 100. For example, COD provider 104-1 may be a cable television headend that communicates through the Data Over Cable Service Interface Specification (DOCSIS) standard whereas the COD provider 104-N could be a streaming Internet provider that communicates via the Internet protocol.

Regardless of the protocol, the request manager 120 is operable to process requests from the COD providers 104 and to extract information pertinent to the ADSs 100 such that the ADSs 100 can decide which assets are to be inserted into COD content (i.e., selected by the CPEs 108). Once the ADSs 100 make their asset insertion decisions, the ADSs 100 then convey that information to the request manager 120 which in turn conveys the information to the appropriate COD providers 104 so as to direct the COD providers 104 to insert the assets into their various COD content selections of the CPEs 108.

With this in mind, the request manager 120 is any device, system, software, or combination thereof operable to interface with a plurality of COD providers 104 and a plurality of ADSs 100 to process and direct asset insertion decision requests to appropriate ADSs 100 and to process and direct results of those requests to the appropriate COD providers 104. As each COD provider 104 may employ a unique communication protocol, the request manager 120 may operate as a protocol converter. For example, the ADSs 100 may be configured to communicate asset insertion decisions via a variety of communication protocols. By offloading protocol translation capabilities onto the request manager 120 from the ADSs 100 and the COD providers 104, the request manager 120 can flexibly connect any ADS 100 with virtually any COD provider 104.

In this regard, the request manager 120 may also operate as an ADS switch. For example, if COD provider 104-1 has a contractual obligation with ADS 100-1 to receive asset insertion decisions from the ADS, the request manager 120 can process a request from the COD provider 104-1 for as long as a contractual obligation exist. However, once the contractual obligation ends, the COD provider 104 may wish to receive asset insertion decisions from the ADS 100-N. The request manager 120 is operable to receive that request and direct it to the ADS 100-N without the COD provider 104-1 having to reconfigure its communications.

Also illustrated in FIG. 5 are the communication networks 110-1 and 110-2. The communication networks 110 are merely intended to show a communicative coupling between the request manager 120, the ADSs 100, and the COD providers 104. The communication networks 110 can be implemented in a variety ways as a matter of design choice. In one embodiment, the request manager 120 is a separate and distinct entity from each of the COD providers 104 and the ADSs 100. For example, the request manager 120 may be implemented as an Internet server such that the ADSs 100 and the COD providers 104 can communicate to the request manager 120 through the Internet. Such may be implemented through web portals that the ADSs 100 and the COD providers 104 communicate through using their respective communication protocols such that the request manager 120 can appropriately convert those protocols and switch/route appropriately.

Figure 6:
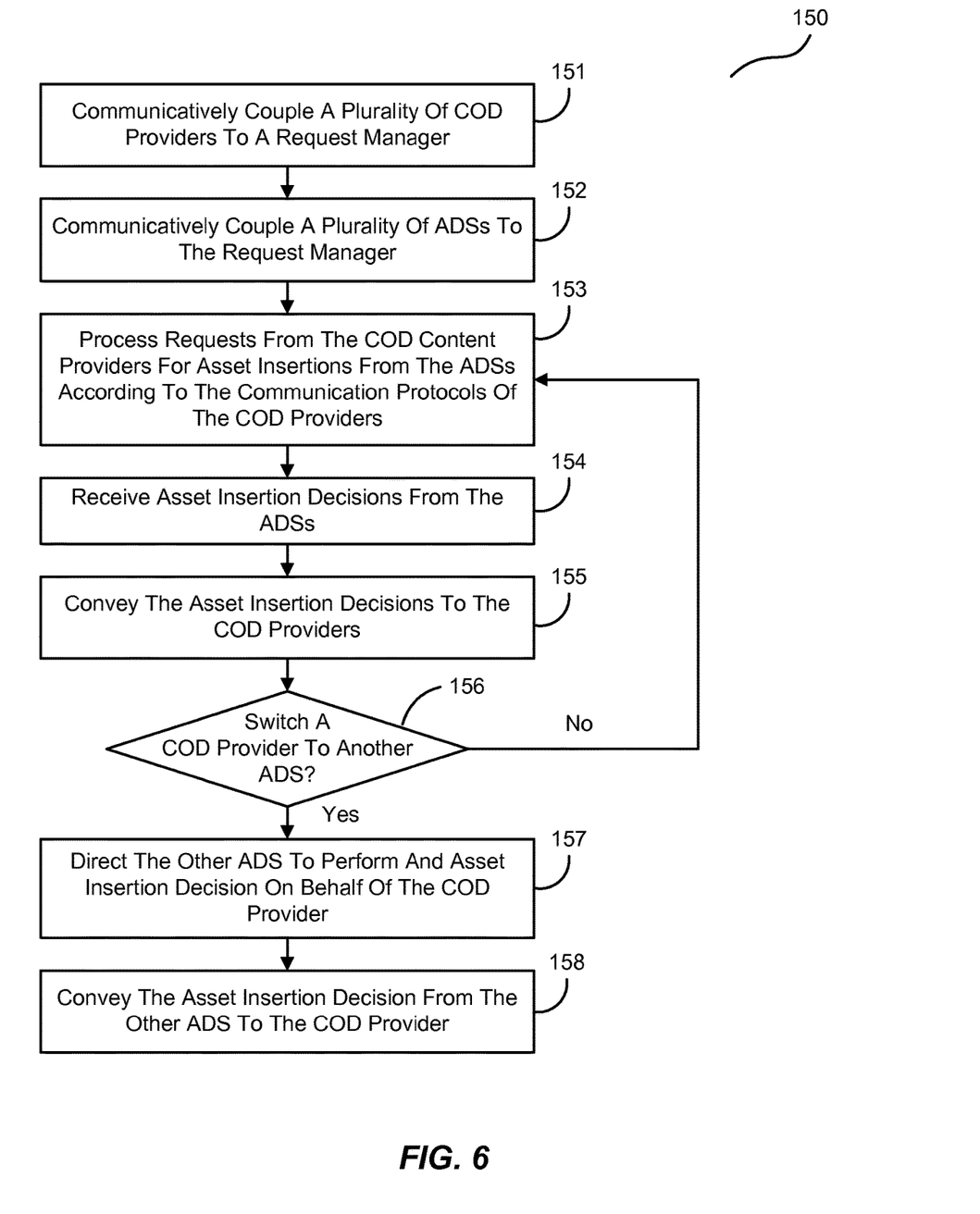
FIG. 6 is a flowchart of an exemplary process operable with the request manager of FIG. 5.

FIG. 6 is a flowchart of an exemplary process 150 operable with the system of FIG. 5. In this embodiment, the request manager 120 communicatively couples to a plurality of COD providers 104-1-104-N, in the process element 151. The request manager 120 also communicatively couples to a plurality of ADSs 100-1-100-N, in the process element 152. Thereafter, the request manager begins processing requests from the COD content providers 104 for asset insertions from the ADSs 100 according to the communication protocols of the COD providers 104, in the process element 153. Based on the requests, the request manager 120 receives asset insertion decisions from the ADSs 100, in the process element 154. The request manager 120 then conveys those asset insertion decisions to the COD providers 104, in the process element 155.

In the process element 156, the request manager 120 detects a switch from one COD provider 104 to another ADS 100. For example, the COD provider 104-1 may decide to switch from using the ADS 100-1 to using the ADS 100-N, as similarly described above. Such may involve the content provider 104-1 configuring an asset insertion decision request with an address that allows the request manager 120 to route the request to the appropriate ADS 100. In any case, if a switch by COD provider 104 to another ADS 100 is detected by the request manager 120, the request manager 120 directs the other ADS 100 to perform the asset insertion decision on behalf of the COD provider 104, in the process element 157, and then conveys any subsequent asset insertion decisions from the other ADS 100 to the COD provider 104, in the process element 158. Otherwise, the request manager 120 continues processing requests from the COD content providers 104 in accordance with the process element 153.

Figure 7:
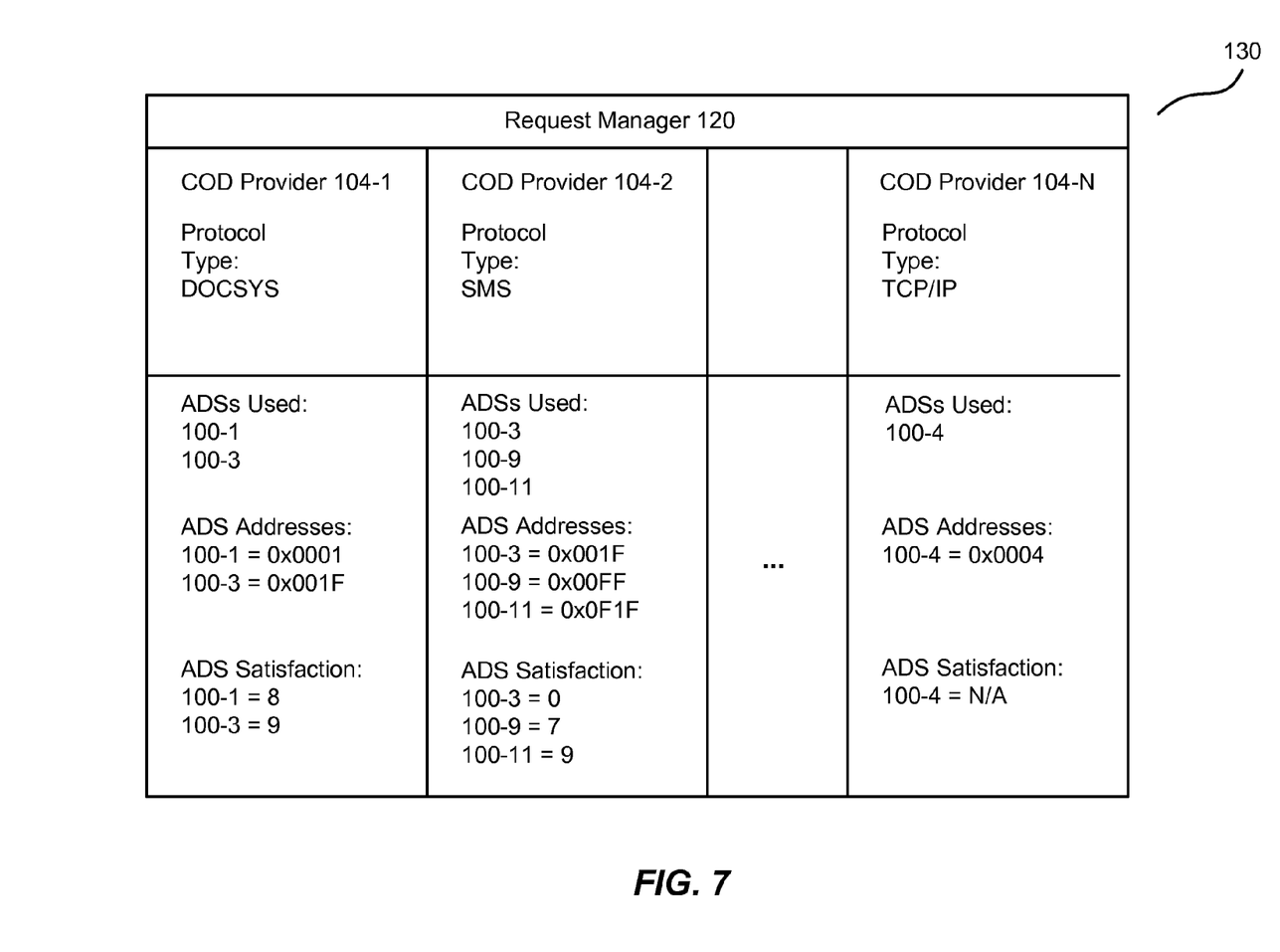
FIG. 7 is a diagram of a data structure operable with the request manager.

FIG. 7 is a diagram of a data structure 130 operable with the request manager 120. The data structure 130 comprises a list of COD providers 104 that the request manager 120 interfaces with. The data structure 130 may include information pertaining to the type of protocol used for each of the COD providers 104. As shown herein, the COD provider 104-1 employs the DOCSIS communication protocol of the cable television industry, the COD provider 104-2 employs SMS (short message service) messaging, and the COD provider 104-N employs TCP/IP messaging. Thus, the request manager 120 can interface and operate with a variety of COD content providers 104 including, for example, cable television headend, satellite television networks, streaming Internet video providers, and even individual users.

For example, assume that an individual wishes to share a video with other users of a particular group such as that done in Facebook, Twitter, Instagram, and the like. If the individual desires some monetary reward for displaying that video to the users of the group, the user may contact an ADS 100 through the user's CPE 108 (e.g., cell phone, laptop computer, tablet computer, and the like) through SMS messaging. The request manager 120 being operable to process requests from a variety of communication protocols, contacts the appropriate ADS 100 to direct the ADS to provide an asset insertion decision based on that SMS request. Thus, the invention is not intended to be limited to any particular form of content provider, the communication protocol, asset provider, etc.

Also illustrated with the data structure 130 are the various ADS 100s used by the COD providers 104. For example, the COD provider 104-1 uses ADS 100-1 and ADS 100-3 to provide asset insertion decisions for the content provided by the COD provider 104-1. The data structure 130 may thus also include addresses associated with the ADS 100-1 and ADS 100-3 so that the request manager 120 may process the request for the asset insertion decisions and quickly route them to the appropriate ADS. Although exemplarily illustrated as numerical addresses, these addresses may represent regions where ADSs are located. For example, an ADS 100-1 may generate asset insertion decisions based on a particular region/demographic according to various demographics. The COD provider 104-1, desiring to target that particular region, may request the ADS 100-1 to perform the asset insertion decision (e.g., because the COD content is being delivered to that particular region).

In this exemplary embodiment, the data structure 130 illustrates that the COD provider 104-N has previously used a single ADS 100-4. Such may be the result of a contractual obligation between the COD provider 104-N and the ADS 100-4. The request manager 120 is operable to retain information pertaining to the contractual obligation in the data structure 130 so as to prevent the request manager 120 from incorrectly routing ADS requests.

Also illustrated in the data structure 130 is an ADS satisfaction. For example, a COD provider 104 may request a particular ADS to perform an asset insertion decision for content being delivered to the user CPE 108. As a result of that asset insertion decision, the content provider 104 may insert assets corresponding to that decision. However, the COD provider 104 may or may not be particularly satisfied with the results of the asset insertion decision. Accordingly, the COD provider 104 may provide a relative level of satisfaction to the request manager 120 through the communication protocol of the COD provider 104 (e.g., 0 being relatively low satisfaction and 9 being relatively high satisfaction). Thus, if a COD provider 104 is not contractually obligated to select any particular ADS 100 and the COD provider 104 fails to notify the request manager 120 of the appropriate ADS 100 to use, the request manager 120 can automatically select an ADS 100 on behalf of the COD provider 104.

To illustrate, assume that the COD provider 104-1 is a cable television headend that has been contacted to provide the COD content to a user's CPE 108. The COD provider 104-1 then contacts the request manager 120 for an asset insertion decision into the selected COD content. If the COD provider 104-1 fails to indicate which of the ADSs 100-1 and 100-3 it wishes to be used, the request manager 120 may automatically select the ADS 100-3 because it has provided a higher level of satisfaction to the COD provider 104-1 in the past.

The embodiments of the request manager 120 herein provide COD providers 104 with a wide range of selectability in terms of asset insertion decisioning. The request manager 120 also decouples the complexity of protocol conversion between COD providers 104 and ADSs 100 and allows each of those systems to operate more freely and independently. Moreover, the request manager 120 (e.g. through the implementation of the data structure 130) is operable to ensure that information of COD providers 104 and/or ADS 100 is not shared. For example, COD providers 104 generally desire keeping their marketing results and decisions private. The request manager 120, in this regard, is operable to hide asset insertion decisions of the COD provider 104-1 from the asset insertion decisions of the COD provider 104-2, as one example. Similarly, the ADSs 100 do not wish to disclose any potential algorithms they may use to make their asset insertion decisions through the disclosure of their asset insertion decisions. Accordingly, the request manager 120 ensures to keep that information private.

Figure 8:
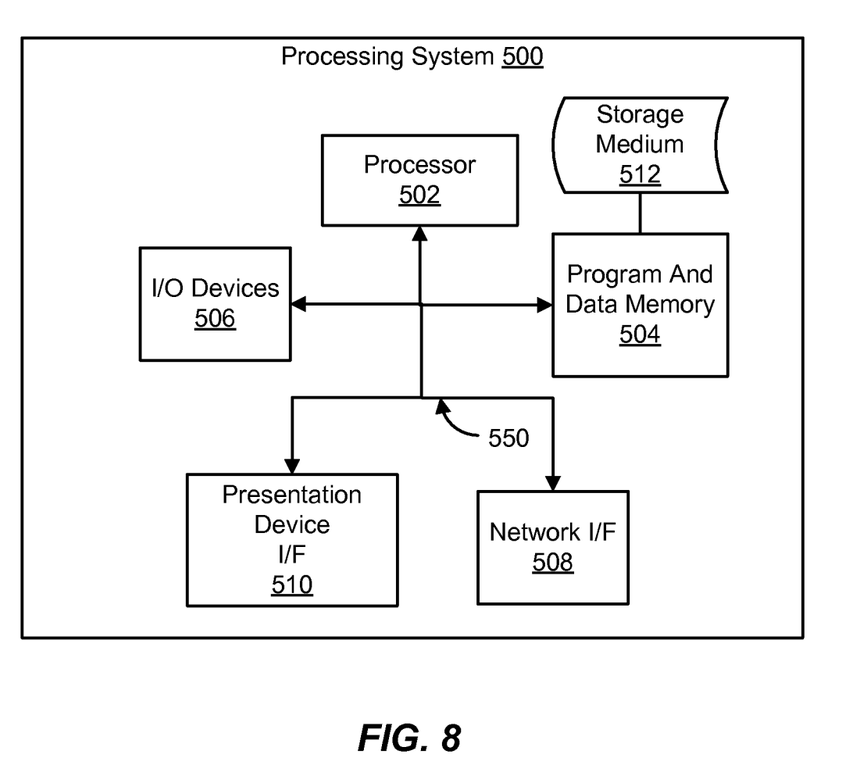
FIG. 8 is a block diagram of an exemplary processing system operable to link internet-based user accounts to their equipment for improved targeted advertising.

While some embodiments herein illustrate the request manager 120 as being a computer server or other network element, the invention is not intended to be limited to any particular implementation. For example, FIG. 8 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, computer readable storage medium 512 can be anything that can contain, store, communicate, or transport the program for use by a computer.

The computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. Memory elements 504 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 506 (including but not limited to keyboards, displays, pointing devices, etc.) can be coupled to the processing system 500 either directly or through intervening I/O controllers. Network adapter interfaces 508 may also be coupled to the system to enable the processing system 500 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by the processor 502.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only a preferred embodiment and variants thereof have been shown and described and that all changes and modifications that come within the spirit of the invention are desired to be protected.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass satellite content providers that offer COD content and/or Internet services to its subscribers. That content is typically delivered directly to the subscriber's antenna for demodulation and decryption by the subscriber's CPE 108. Internet traffic in such a system may be conveyed by satellite and/or other delivery mechanisms (e.g., digital subscriber lines, or "DSL", delivered through subscriber phone lines).

A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein, is any type of media, such as audio and/or video, in which assets may be inserted. For example, the content operable within the COD delivery systems described herein may be streamed Internet audio/video, analog cable television feeds, digital cable television feeds, digital satellite television feeds, or digital satellite radio feeds. Thus, the content of the COD described herein is intended to encompass Video on Demand (VOD) and pay-per-view (PPV) delivered by both modern cable television and satellite television.

What is claimed is:

1. A method operable in a Content On Demand (COD) environment comprising a plurality of COD providers, the method comprising:
communicatively coupling a plurality of COD providers to a request manager, wherein at least two of the COD providers have different communication protocols,
communicatively coupling a plurality of asset decision systems (ADSs) to the request manager; and
processing requests from the COD content providers through the request manager for asset insertions from the ADSs according to the communication protocols of the COD providers;
receiving asset insertion decisions from the ADSs;
conveying the asset insertion decisions of the ADSs to the COD providers;
processing a request from a first of the COD providers to switch from a first of the ADSs to a second of the ADSs;
directing the second ADS to perform an asset insertion decision on behalf of the first COD provider; and
conveying the asset insertion decision from the second ADS to the first COD provider.

2. The method of claim 1, further comprising:
processing another request from the first COD provider to switch from the second ADS;
directing the first ADS to perform another asset decision on behalf of the first COD provider; and
conveying the asset decision from the first ADS to the first COD provider.

3. The method of claim 1, wherein:
the protocol of the first COD provider is a Data Over Cable Service Interface Specification.

4. The method of claim 1, wherein:
the first COD provider is a satellite television provider.

5. The method of claim 1, wherein:
the first COD provider is an Internet streaming provider.

6. The method of claim 1, wherein:
the first COD provider is a customer premise equipment (CPE); and
the method further comprises:
processing a request for an asset insertion decision from a user of the CPE; and
directing a third of the ADSs to perform the asset insertion decision on behalf of the first COD provider.

7. A non-transitory computer readable medium comprising instructions that, when executed by a processor of a request manager operable in a Content On Demand (COD) environment comprising a plurality of COD providers, direct the processor to:
communicatively couple a plurality of COD providers to a request manager, wherein at least two of the COD providers have different communication protocols,
communicatively couple a plurality of asset decision systems (ADSs) to the request manager; and
process requests from the COD content providers through the request manager for asset insertions from the ADSs according to the communication protocols of the COD providers;
receive asset insertion decisions from the ADSs;
convey the asset insertion decisions of the ADSs to the COD providers;
process a request from a first of the COD providers to switch from a first of the ADSs to a second of the ADSs;
direct the second ADS to perform an asset insertion decision on behalf of the first COD provider; and
convey the asset insertion decision from the second ADS to the first COD provider.

8. The computer readable medium of claim 7, further comprising instructions that direct the processor to:
process another request from the first COD provider to switch from the second ADS;
direct the first ADS to perform another asset decision on behalf of the first COD provider; and
convey the asset decision from the first ADS to the first COD provider.

9. The computer readable medium of claim 7, wherein:
the protocol of the first COD provider is a Data Over Cable Service Interface Specification.

10. The computer readable medium of claim 7, wherein:
the first COD provider is a satellite television provider.

11. The computer readable medium of claim 7, wherein:
the first COD provider is an Internet streaming provider.

12. The computer readable medium of claim 7, wherein:
the first COD provider is a customer premise equipment (CPE); and
the computer readable medium further comprises instructions that direct the processor to:
process a request for an asset insertion decision from a user of the CPE; and
direct a third of the ADSs to perform the asset insertion decision on behalf of the first COD provider.

13. A request manager operable in a Content On Demand (COD) environment comprising a plurality of COD providers, the request manager comprising:
a plurality of COD provider interfaces, each being operable to link to a COD provider of the plurality of COD providers, wherein at least two of the COD providers have different communication protocols;
a plurality of asset decision system (ADS) interfaces each being operable to link to an ADS of a plurality of ADSs; and
a request processor communicatively coupled to the ADS interfaces and to the COD interfaces,
wherein the request processor is operable to process requests from the COD content providers for asset insertions from the ADSs according to the communication protocols of the COD providers, to receive asset insertion decisions from the ADSs, and to convey the asset insertion decisions of the ADSs to the COD providers, and wherein the request processor is further operable to switch a first of the COD providers from a first of the ADSs to a second of the ADSs to have the second ADS perform the asset insertion decision on behalf of the first content provider.

14. The request manager of claim 13, wherein:

the request processor is further operable to process another request from the first COD provider to switch from the second ADS, direct the first ADS to perform another asset decision on behalf of the first COD provider, and convey the asset decision from the first ADS to the first COD provider.

15. The request manager of claim 13, wherein:

the protocol of the first COD provider is a Data Over Cable Service Interface Specification.

16. The request manager of claim 13, wherein:

the first COD provider is a satellite television provider.

17. The request manager of claim 13, wherein:

the first COD provider is an Internet streaming provider.

18. The request manager of claim 13, wherein:

the first COD provider is a customer premise equipment (CPE); and the request manager is further operable to process a request for an asset insertion decision from a user of the CPE, and to direct a third of the ADSs to perform the asset insertion decision on behalf of the first COD provider.

* * * * *